US011715381B1

(12) United States Patent
Haering, Jr. et al.

(10) Patent No.: US 11,715,381 B1
(45) Date of Patent: Aug. 1, 2023

(54) METHOD FOR IDENTIFYING AIRCRAFT THAT EXCEED A SPECIFIED NOISE CONDITION IN A DEFINED GEOGRAPHICAL AREA

(71) Applicant: United States of America as Represented by the Administrator of NASA, Washington, DC (US)

(72) Inventors: Edward A. Haering, Jr., Lancaster, CA (US); Jacob J. Ediger, Roamond, CA (US); Lydia J. Hantsche, Tehachapi, CA (US); Samuel R. Kantor, Palmdale, CA (US); Stanton K. Yarbrough, Rosamond, CA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 0 days.

(21) Appl. No.: 17/358,313

(22) Filed: Jun. 25, 2021

Related U.S. Application Data

(60) Provisional application No. 63/044,569, filed on Jun. 26, 2020.

(51) Int. Cl.
*G01S 5/18* (2006.01)
*G08G 5/00* (2006.01)

(52) U.S. Cl.
CPC .............. *G08G 5/0082* (2013.01); *G01S 5/18* (2013.01)

(58) Field of Classification Search
CPC .................................. G08G 5/0082; G01S 5/18
See application file for complete search history.

(56) References Cited

U.S. PATENT DOCUMENTS

| 10,302,759 B1 * | 5/2019 | Arteaga ............... G08G 5/0082 |
| 2005/0098681 A1 * | 5/2005 | Berson ................. G08G 5/0052 |
| | | 244/1 N |
| 2007/0256491 A1 * | 11/2007 | Tillotson ................... G01S 3/80 |
| | | 73/170.13 |

FOREIGN PATENT DOCUMENTS

CN          209014139 U  *  6/2019  ............. G01D 21/02

* cited by examiner

*Primary Examiner* — Isam A Alsomiri
*Assistant Examiner* — Abdallah Abulaban
(74) *Attorney, Agent, or Firm* — Hema G. Sresty; Jennifer L. Riley; Trent J. Roche

(57) ABSTRACT

The invention is a method for identifying aircraft, flying at supersonic speeds, that exceed a specified noise condition in a defined geographical area that may be employed once restrictions to supersonic aircraft flights over the United States are lifted.

7 Claims, 3 Drawing Sheets

METHOD FOR IDENTIFYING AIRCRAFT THAT EXCEED A SPECIFIED NOISE CONDITION IN A DEFINED GEOGRAPHICAL AREA

CROSS REFERENCE TO RELATED APPLICATIONS

This application claims the benefit of priority under 35 U.S.C. § 119(e) from U.S. Provisional Patent Application Ser. No. 63/044,569 filed on Jun. 26, 2020, the contents of which are incorporated herein by reference.

STATEMENT OF GOVERNMENT INTEREST

The invention described herein was made in the performance of work under a NASA contract and by an employee of the United States Government and is subject to the provisions of Section 20135(b) of the National Aeronautics and Space Act, Public Law 111-314, § 3 (124 Stat. 3330, 51 U.S.C. Chapter 201), and may be manufactured and used by or for the Government for governmental purposes without the payment of any royalties thereon or therefore.

BACKGROUND OF THE INVENTION

1. Field of the Invention

The present invention relates generally to methods for identifying aircraft that exceed specified noise conditions in a defined geographical area and more specifically to identifying supersonic aircraft that create sonic booms exceeding maximum allowable noise levels on the ground within a defined geographical area.

2. Description of the Related Art

A primary challenge of detecting sonic booms (also known as "sonic thumps" or "thumps") and other noises from aircraft exceeding a specified threshold is locating and identifying the specific aircraft from which a thump or noise was made in complex environmental and terrain conditions. The Aircraft Noise Abatement Act of 1968 directed the Federal Aviation Administration (FAA), after consultation with the Department of Transportation (DOT), to "prescribe and amend standards for the measurement of aircraft noise and sonic boom," and, " . . . such rules and regulations as the (administrator of the FAA) may find necessary to provide for the control and abatement of aircraft noise and sonic boom." In 1970, the FAA proposed a regulation that would restrict operation of civil aircraft at speeds greater than Mach 1, unless authorized by the FAA, which was finalized in 1973.

While supersonic civilian aircraft are currently prohibited from operating over land in the United States at speeds greater than Mach 1, advances in aircraft technology such as lighter and more efficient composite materials, combined with new engine and airframe designs, may lead to more economically and environmentally viable supersonic civilian aircraft. As such, many experts expect changes in the rules prohibiting operation of supersonic civilian aircraft flying over the United States. Such rules will likely require supersonic civilian aircraft to meet certain noise thresholds associated with their operation and with that, noise detection technologies will be needed to ensure that such aircraft meet said thresholds.

Current noise detection systems and techniques for aircraft are predominantly used near airports to ensure that existing civilian aircraft do not exceed the noise limits prescribed by the government for operation. While these systems may adequately detect noises for aircraft landing and taking off from a runway, they are not well-suited to be deployed in significant quantities throughout the United States to monitor all civilian aircraft operating in flight. In addition, the systems do not need to identify which aircraft among many has exceeded a maximum noise level since it is clear which aircraft made the noise based on the time of its arrival or departure on the airport runway. Due to these limitations, a new solution will be needed that can both identify specific aircraft among many in flight that exceed a specified noise level and also provide an inexpensive solution that can be readily deployed in large quantities throughout the country to monitor all aircraft in flight.

SUMMARY OF THE INVENTION

The invention described herein comprises a method for identifying aircraft, flying at supersonic speeds, that exceeds a specified noise condition in a defined geographical area. A computer processor is configured to receive operating data from all aircraft within a defined geographical area or range. Using the operating data from each aircraft, the computer processor computes a Mach cone trailing each aircraft and a ray cone forward of each aircraft within the geographical area at a discrete point in time. The computation results in an isolabe, where the Mach cone intersects the ground plane, and an isopemp, where the ray cone intersects the ground plane. The isolabe indicates a noise arrival time, and the isopemp indicates the noise arrival location and the noise arrival angle. The computer processor extrapolates the computation of the isolabe for each aircraft to numerous future times assuming each aircraft is traveling with constant speed and on a constant course. This extrapolation yields future isolabes to predict a noise arrival time at the ground plane within the defined geographical area.

A noise detection system is also connected to the computer processor to identify an actual noise that exceeds the specified noise condition, such as a sonic boom, at a specific location. The noise detection system also detects the actual noise arrival angle and actual noise arrival time within the defined geographical range. Once the actual noise is detected, the actual noise, its arrival time, its location, and its arrival angle are compared to the predicted noise arrival times, noise arrival locations, and noise arrival angles for each aircraft to identify which aircraft, among many, exceeded the specified noise condition.

BRIEF DESCRIPTION OF THE DRAWINGS

In the drawings, which are not necessarily to scale, like or corresponding parts are denoted by like or corresponding reference numerals.

DETAILED DESCRIPTION OF THE INVENTION

Figure 1:
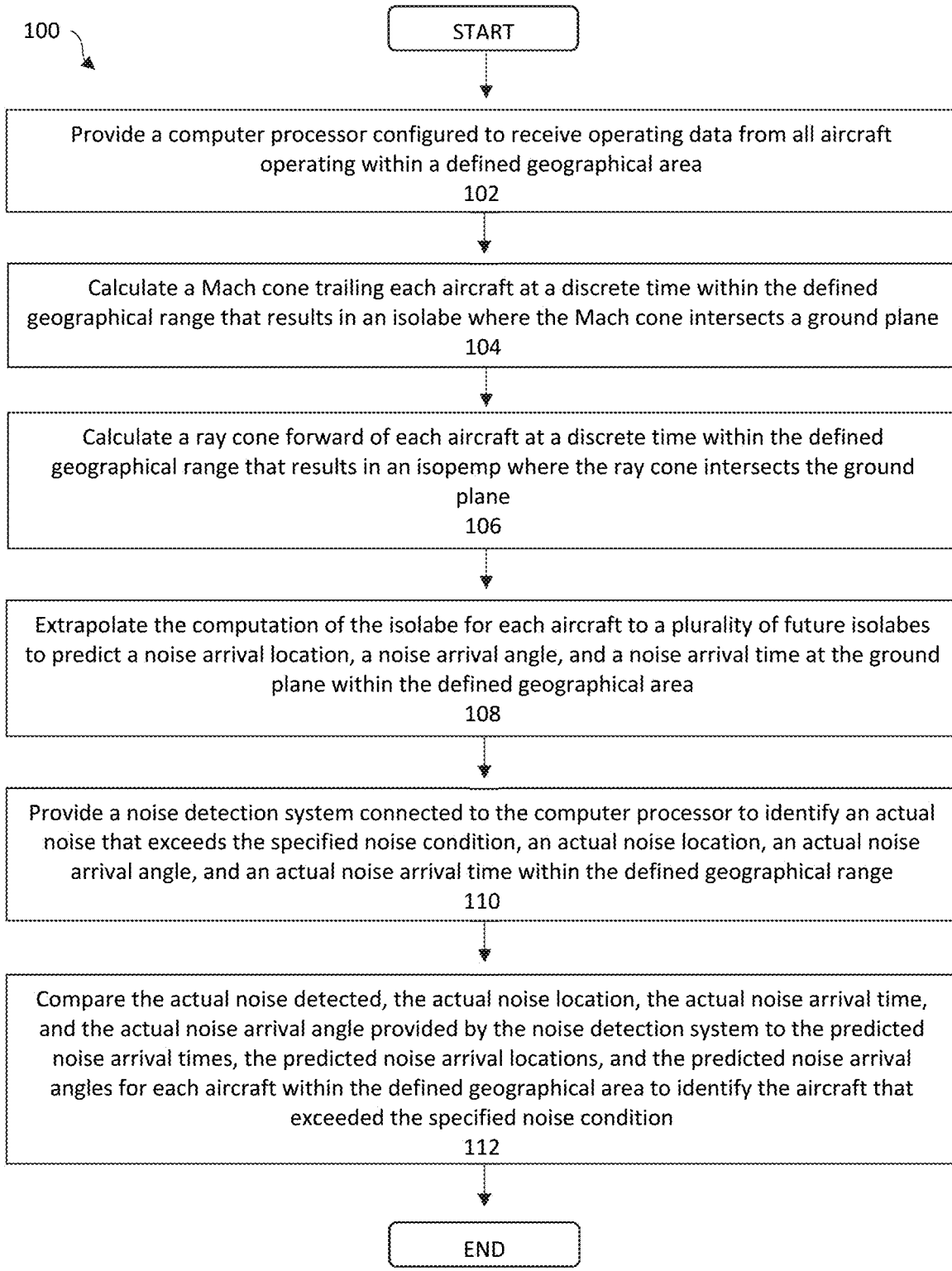
FIG. 1 depicts a flow chart of the steps used to identify an aircraft that exceeds a specified noise condition in a defined geographical area.
Figure 2:
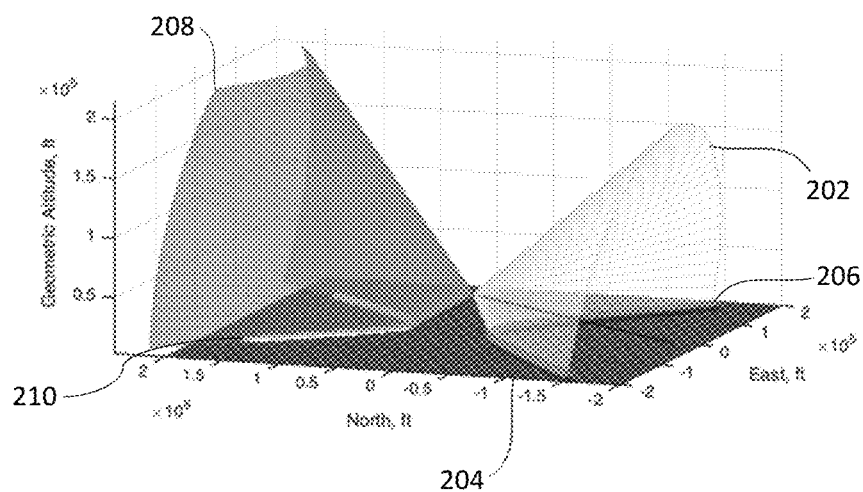
FIG. 2 depicts a graphical representation of the computation of the Mach cone, ray cone, isolabe, and isopemp for one aircraft at a single point in time.
Figure 3:
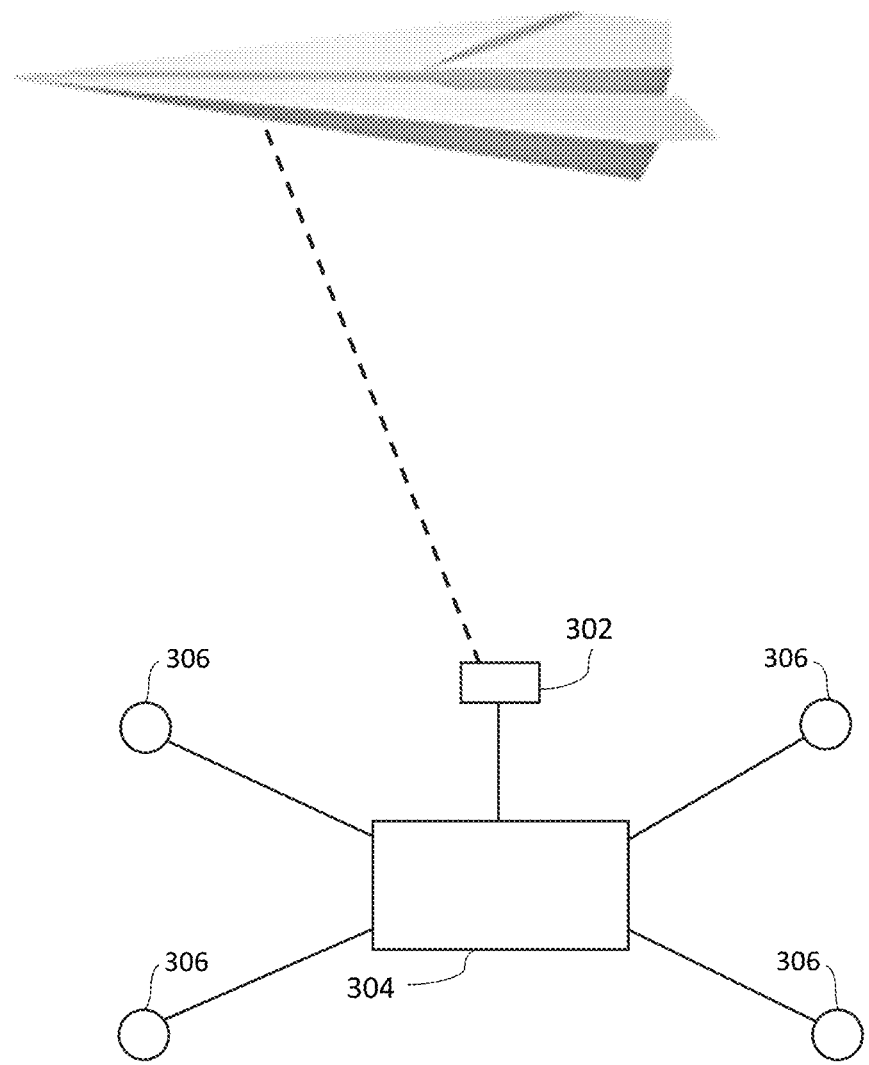
FIG. 3 depicts a representation of the computer processor and noise detection system of an embodiment of the present invention.

Referring to FIGS. 1-3, the first step 102 of the method 100 for identifying aircraft that exceeds a specified noise condition in a defined geographical area is to provide a computer processor 302 configured to receive operating data from all aircraft operating within a defined geographical area. In the preferred embodiment, the specified noise condition is the maximum noise level allowed by law for an aircraft operating over land (or offshore but near enough to be heard on land) within a specific jurisdiction or defined geographical area. The computer processor 302 can be any mechanism capable of computing mathematical solutions to mathematical equations using input data. The input data can be stored on the computer processor 302 prior to operation, or the input data can be acquired over a communications network so that the data can be updated in real time. In the preferred embodiment, the computer processor 302 is a small, inexpensive computing apparatus (such as a Raspberry Pi computer or a smart phone) that obtains Automatic Dependent Surveillance-Broadcast (ADS-B) data for each aircraft over a communications network. The ADS-B data include all of the standard aircraft operational data associated with the ADS-B network. The relevant operational data associated with the present invention includes the aircraft identification code, aircraft location, the ground speed, the vertical speed, and the above ground level (AGL) altitude for each aircraft. A Mach angle for each aircraft is computed from the ground speed and vertical speed from the ADS-B data, an assumed speed of sound, and an assumed wind profile (or zero winds). A flight path angle for each aircraft is computed from the ground speed and vertical speed from the ADS-B data, and an assumed wind profile (or zero winds). In another embodiment, a turn rate is calculated for each aircraft via the differentiation of the true course for each aircraft over time. In another embodiment, the computer processor 302 can also obtain real-time weather and other environmental data from various sources (either ground stations, weather balloons, aircraft sensors or the like) to improve the calculations discussed herein. While the preferred embodiment uses ADS-B data, the invention can source the relevant operational data from any similar system known to one having ordinary skill in the art (for example, via a 1090 MHz Mode S Extended Squitter transponder, also known as 1090-ES, which also includes the Mach number in the set of operational data provided). The predefined geographical area can be any preset distance or range selected by the user. In general, the predefined geographical area will be selected based on the capabilities of the communication network that provides data to the computer processor and noise detection system described herein. In one embodiment of the invention, the predefined geographical area will be between twenty to fifty miles.

The next step 104 is to compute a Mach cone 202 trailing each aircraft within the defined geographical range. The Mach cone 202 is the conical pressure wave front created by the aircraft moving faster than the speed of sound. Where the Mach cone 202 intersects a ground plane 204 (e.g., the surface of the Earth), an isolabe 206 having the shape of a hyperbola is created. The isolabe 206 indicates a noise arrival time for the sonic boom as it reaches the ground plane 204. The isolabe 206 of the Mach cone 202 may be calculated using the ADS-B data communicated to the computer processor 302 as described in step 102. In general, the isolabe 206 relative to the aircraft is calculated using the location of the aircraft, the Mach angle, the flight path angle, and the altitude. More specifically, the isolabe 206 may be calculated using the following equation:

$$yl = f(xl, \mu, \gamma, AGL) = \\ AGL\{[\tan^2\mu - \tan^2\gamma]\cos^2\gamma + 1\}\tan\gamma - \\ \frac{\cos\gamma\sqrt{[\tan^2\mu - \tan^2\gamma](AGL^2\{[\tan^2\mu - \tan^2\gamma]\sin^2\gamma + 2\tan^2\gamma - \sec^2\gamma\} - xl^2)}}{([\tan^2\mu - \tan^2\gamma]\cos^2\gamma)}$$

wherein "xl" is the lateral location, "$\mu$" is the Mach angle, "$\gamma$" is the flight path angle, "AGL" is the above ground level altitude, and "yl" is the calculation of the isolabe 206 for the location orthogonal to "xl" for one aircraft. In the preferred embodiment, in this step, the computer processor 302 calculates isolabes 206 for each aircraft operating within the defined geographical area at a discrete point in time.

The next step 106 is to compute a ray cone 208 forward of each aircraft perpendicular to the Mach cone 202 within the defined geographical range. The ray cone 208 calculation results in an isopemp 210 having the shape of a hyperbola where the ray cone 208 intersects a ground plane 204 (e.g., the surface of the Earth), wherein the isopemp 210 indicates noise arrival locations and noise arrival angle for an aircraft. In general, the isopemp 210 is calculated using the same aircraft data as is used to calculate the isolabe 206 as noted above. More specifically, the isopemp 210 is calculated using the following equation:

$$yp = f(xp, \mu, \gamma, AGL) = \\ AGL\{[\cot^2\mu - \tan^2\gamma]\cos^2\gamma + 1\}\tan\gamma + \\ \frac{\cos\gamma\sqrt{[\cot^2\mu - \tan^2\gamma](AGL^2\{[\cot^2\mu - \tan^2\gamma]\sin^2\gamma + 2\tan^2\gamma - \sec^2\gamma\} - xp^2)}}{[\cot^2\mu - \tan^2\gamma]\cos^2\gamma}$$

wherein "xp" is the lateral location, "$\mu$" is the Mach angle, "$\gamma$" is the flight path angle, "AGL" is the above ground level altitude, and "yp" is the calculation of the isopemp 210 for the location orthogonal to "xp" for one aircraft. In the preferred embodiment, in this step, the computer processor 302 calculates isopemps 210 for each aircraft operating within the defined geographical area at a discrete point in time.

The next step 108 is to extrapolate the computations of the isolabe 206 for each aircraft to a plurality of future times assuming constant speed and constant course for each aircraft, yielding future isolabes to predict a noise arrival time at the ground plane 204 within the defined geographical area. In the preferred embodiment, the future isolabes are computed using the equation in step 104, except the data for the lateral location, Mach angle, flight path angle, and above ground level (AGL) altitude are the future projected data at a plurality of future times assuming constant speed and course for each aircraft. In one embodiment, step 108 is periodically being updated over time to refine the predicted noise arrival times (or to verify that the original predictions were accurate). In another embodiment, real-time data for aircraft speed and course may also be used to refine the calculations described herein.

The next step 110 is to provide a noise detection system 304 connected to the computer processor 302 to identify an actual noise that exceeds the specified noise condition within the defined geographical range and the angle from which the noise arrives. The noise detection system 304 identifies noises above the noise threshold and the specific angle from the ground plane from where said noise originated. The noise detection system 304 may be any known in the art that can detect noises above the noise threshold and can identify the noise arrival angle known to one of skill in the art. Examples of noise detection systems 304 that may be employed in the present invention includes arrays of microphones or similar sound sensors.

In a preferred embodiment, the noise detection system 304 comprises an array of at least three microphones 306 or sound sensors to identify the noise arrival angle (the noise arrival angle can be calculated using the subtle differences in noise arrival times at each individual microphone 306) at the location of the noise detection system 304. In a more preferred embodiment, the noise detection system 304 should comprise at least four microphones 306 or sound sensors in order to accurately calculate the noise arrival angle. The subtle differences in noise arrival times between each of the microphones 306 or sound sensors allows the computer processor 302 to calculate the angle at which the actual noise has arrived at the location of the noise detection system 304.

In another embodiment, the noise detection system 304 does not continuously operate. Instead, the noise detection system 304 turns on and begins operation prior to a predicted noise arrival time (via the extrapolation of the computations of the isolabes 206 for each aircraft as shown in step 108). Once the actual noise that exceeds a specified noise condition has arrived at the location of the noise detection system 304, the noise detection system 304 will turn off after the actual noise is identified. In final step 112, the computer processor 302 compares the actual noise, the actual noise arrival time, and actual noise arrival angle recognized by the noise detection system 304 to the predicted noise arrival times, noise arrival locations, and noise arrival angles for each aircraft within the defined geographical area that has created an isopemp 210 and isolabe 206 in the previous steps. Through this comparison, the computer processor 302 identifies which specific aircraft created the boom identified by the noise detection system 304.

What is described herein are specific examples of many possible variations on the same invention and are not intended in a limiting sense. The claimed invention can be practiced using other variations not specifically described above.

We claim:

1. A method for identifying supersonic aircraft that exceed a specified noise condition in a defined geographical area comprising the steps of:
   providing a computer processor configured to receive operating data from all aircraft operating within a defined geographical area;
   calculating a Mach cone trailing each aircraft at a discrete time within the defined geographical range that results in an isolabe where the Mach cone intersects a ground plane;
   calculating a ray cone forward of each aircraft at a discrete time within the defined geographical range that results in an isopemp where the ray cone intersects the ground plane;
   extrapolating the computation of the isolabe for each aircraft to a plurality of future times assuming constant speed and constant course for each aircraft, yielding future isolabes to predict a noise arrival time at the ground plane within the defined geographical area;
   providing a noise detection system connected to the computer processor to identify an actual noise that exceeds the specified noise condition, an actual noise location, an actual noise arrival angle, and an actual noise arrival time within the defined geographical range; and
   comparing the actual noise detected, the actual noise location, the actual noise arrival time, and the actual noise arrival angle provided by the noise detection system to the predicted noise arrival times, the predicted noise arrival locations, and the predicted noise arrival angles for each aircraft within the defined geographical area to identify the aircraft that exceeded the specified noise condition;
   wherein the isolabes are calculated using:

$$yl = f(xl, \mu, \gamma, AGL) =$$

$$\frac{AGL\{[\tan^2\mu - \tan^2\gamma]\cos^2\gamma + 1\}\tan\gamma - \cos\gamma\sqrt{[\tan^2\mu - \tan^2\gamma](AGL^2\{[\tan^2\mu - \tan^2\gamma]\sin^2\gamma + 2\tan^2\gamma - \sec^2\gamma\} - xl^2)}}{[\tan^2\mu - \tan^2\gamma]\cos^2\gamma}$$

wherein "xl" is a lateral location, "$\mu$" is a Mach angle, "$\gamma$" is a flight path angle, "AGL" is an above ground level altitude, and "yl" is the isolabe location orthogonal to the lateral location "xl" for each aircraft.

2. The method of claim 1, wherein after the extrapolating step, further comprises the step of:
   updating the extrapolation of the computation of the isolabe for each aircraft based on updated real-time ADS-B data to obtain an updated noise arrival time at the ground plane within the defined geographical area; and using said updated arrival time data in the comparing step.

3. The method of claim 1, wherein the extrapolation step uses real time speed and course data.

4. The method of claim 1, wherein the noise detection system comprises an array of at least three microphones.

5. The method of claim 1, wherein the calculation of the isolabe and isopemp comprises using lateral location, Mach angle, flight path angle, and altitude of each aircraft.

6. The method of claim 5, where the isopemp is calculated using:

$$yp = f(xl, \mu, \gamma, AGL) =$$

$$\frac{AGL\{[\tan^2\mu - \tan^2\gamma]\cos^2\gamma + 1\}\tan\gamma - \cos\gamma\sqrt{[\tan^2\mu - \tan^2\gamma](AGL^2\{[\tan^2\mu - \tan^2\gamma]\sin^2\gamma + 2\tan^2\gamma - \sec^2\gamma\} - xl^2)}}{[\cot^2\mu - \tan^2\gamma]\cos^2\gamma}$$

wherein "xp" is a lateral location, "$\mu$" is a Mach angle, "$\gamma$" is a flight path angle, "AGL" is an above ground level altitude, and "yp" is the isopemp location orthogonal to lateral location "xp" for each aircraft.

7. The method of claim 1, wherein the noise detection system is turned on before the predicted noise arrival time at the ground plane and is turned off after the actual noise that exceeds the specified noise condition is identified.

* * * * *